United States Patent [19]
Doellinger et al.

[11] Patent Number: 4,530,733
[45] Date of Patent: Jul. 23, 1985

[54] APPARATUS FOR IMPREGNATING REINFORCING FIBER MATERIALS WITH A RESINOUS BINDER MATERIAL

[75] Inventors: Rolf Doellinger, Fischbachau; Rudolf Schindler, Neubiberg, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 559,885

[22] Filed: Jan. 25, 1984

Related U.S. Application Data

[60] Division of Ser. No. 369,641, Apr. 19, 1982, Pat. No. 4,456,495, which is a continuation-in-part of Ser. No. 196,863, Oct. 14, 1980, abandoned.

[30] Foreign Application Priority Data

Oct. 23, 1979 [DE] Fed. Rep. of Germany ....... 2942729

[51] Int. Cl.³ .............................................. B32B 5/02
[52] U.S. Cl. ..................................... 156/441; 118/56; 118/68; 118/118; 118/124; 156/544
[58] Field of Search ............... 156/166, 181, 441, 433, 156/312, 437, 544, 324; 118/56, 58, 63, 65, 68, 110, 112, 124, 118, 244; 427/331, 346, 367, 359

[56] References Cited

U.S. PATENT DOCUMENTS

| 3,042,569 | 7/1962 | Paul | 156/441 |
| 3,367,814 | 2/1968 | Weiner et al. | 156/166 |
| 3,460,978 | 8/1969 | Clayton et al. | 118/419 |
| 3,629,028 | 12/1971 | McLarty | 156/175 |
| 3,737,352 | 6/1973 | Avis et al. | 156/181 |
| 3,762,364 | 10/1973 | Funsch | 118/124 |
| 3,796,624 | 3/1974 | Avis et al. | 156/436 |
| 3,844,813 | 10/1974 | Leonard et al. | 118/118 |
| 3,973,068 | 8/1976 | Weber | 428/198 |
| 4,052,521 | 10/1977 | Ferrari | 118/126 |
| 4,356,212 | 10/1982 | Stafford | 118/124 |

FOREIGN PATENT DOCUMENTS 1346997 of 0000 United Kingdom .

Primary Examiner—Michael Ball
Attorney, Agent, or Firm—W. G. Fasse; D. H. Kane, Jr.

[57] ABSTRACT

Reinforcing fiber materials such as rovings, webbings, and other fiber materials are impregnated with a resinous binder material in such a manner that gaseous inclusions are avoided whereby a surprising increase in the strength of the fiber compound material is achieved. For this purpose the liquid resinous binder material is applied substantially only to one side of the reinforcing material which is then moved through an absorbing zone in which the liquid resinous binder material penetrates the reinforcing material substantially completely as a result of a predetermined residence time and temperature in the absorbing zone. Gas inclusions are removed by adsorption and/or by expulsion. The gas adsorbing and expulsion zone is a chamber in which a plurality of guide rollers are arranged so as to cause the impregnated material to repeatedly reverse its moving direction, whereby the sequential and repeated penetration of the reinforcing material by the resinous material and the removal of gas inclusions are enhanced. Further, the precise weight ratio adjustment of resin to fiber material is enhanced by moving the impregnated material in a substantially vertical orientation through a fulling station. The vertical orientation facilitates the flow off of excess resin.

6 Claims, 4 Drawing Figures

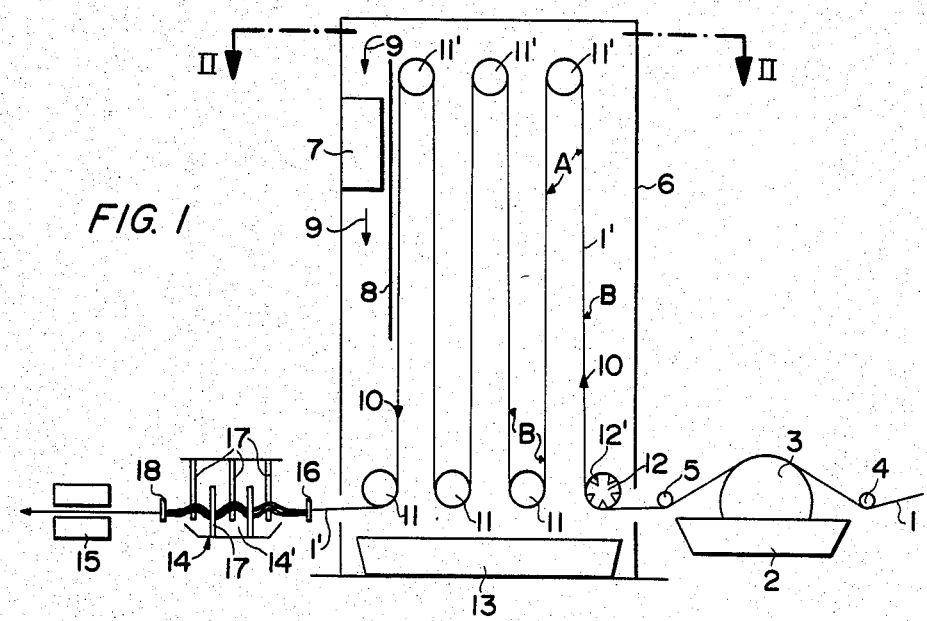
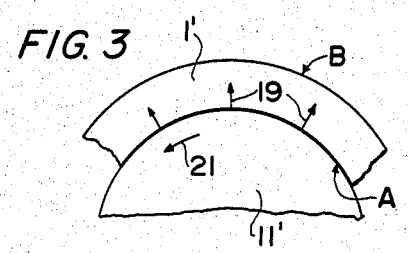
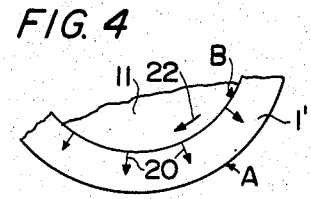
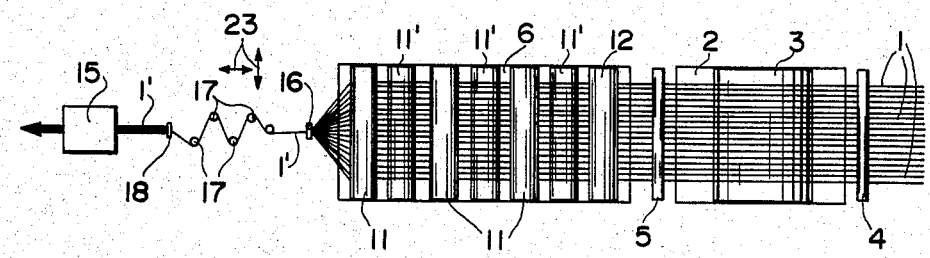

APPARATUS FOR IMPREGNATING REINFORCING FIBER MATERIALS WITH A RESINOUS BINDER MATERIAL

CROSS-REFERENCE TO RELATED APPLICATION

This is a divisional of application Ser. No. 369,641 filed Apr. 19, 1982, now U.S. Pat. No. 4,456,495, which is a continuation-in-part of my copending application Ser. No. 196,863, filed on Oct. 14, 1980, now abandoned. The parent application (U.S. Ser. No. 196,863) is based on German Patent Application No. P 29 42 729.0, filed in the Federal Republic of Germany on Oct. 23, 1979. The priority of the German filing date is claimed for the present continuation-in-part application through the parent application Ser. No. 196,863.

BACKGROUND OF THE INVENTION

The present invention relates to an apparatus for impregnating reinforcing materials with a resinous binder material. The reinforcing materials may, for example, comprise fiber reinforcing materials such as rovings, fleeces, belts, cords, webbings or the like forming bands or strips. The term "band" or "bands" will be used herein as a generic word for the words listed. These bands of reinforcing materials are impregnated by a resinous binder agent for producing fiber compound materials, for example for producing helicopter rotor blades. Conventionally, the resinous binder material is applied to one surface of the reinforcing material.

Where fiber reinforced compound materials are used in the construction of components which are subject to high dynamic wear and tear, it is necessary not only to exclude air bubbles from the impregnated fiber compound material, but also to make sure that the adhesion of the impregnating resin material on the entire surface of the reinforcing fiber material is complete. Spots of non-adhesion have been found to cause a rapid deterioration of the strength characteristic of helicopter rotor blades.

U.S. Pat. No. 3,762,364 (Funsch et al) discloses the coating of synthetic fiber webbings with an adhesive and with rubber for producing car tires. The adhesive is applied to the advancing fabric sheet or belt as the latter is dipped into an adhesive dipping pan, whereby the fabric web is coated with adhesive on both surfaces. Downstream of the dipping pan there is arranged a set of so-called hold-back rollers followed by a drying zone, a heat zone, and a normalizing zone forming together a hot stretching unit which in turn is followed by puller rollers. Downstream of the puller rollers a fabric flexing unit is arranged which in turn is followed by the calendering unit for coating one surface of the fabric with the rubber. The complete exclusion or avoidance of air inclusions in the interstices between adjacent fiber threads is not essential in the construction of pneumatic tires. Thus, in U.S. Pat. No. 3,762,364 the flexing station actually increases the volume of the adhesive coated fabric because the flexibility is more important than the total avoidance of air inclusions. U.S. Pat. No. 3,762,364 refers to minimizing entrapped air pockets, however, such minimizing relates to air pockets between the metal beads of a tire building drum and the tire material prepared as described above.

In other conventional methods a paper web or a reinforcing material is guided over a rotatable impregnating roller dipping into a bath of the resinous binder material. U.S. Pat. No. 4,241,690 (Muller) is representative of such coating. In such methods it is customary to adjust the ratio of the circumferential speed of the impregnating roller to the feed advance speed of the reinforcing material or paper web in order to vary the degree of application of binder material or other coating material to the reinforcing material or other type of web. Excess resinous material may be stripped off, for example, by means of doctor blades or by means of squeezing rollers, please see also German Patent Publication (DE-AS) No. 2,012,107.

According to the prior art method it is possible to apply the binder material in a single operation to the reinforcing material in a precisely adjustable ratio between the binder material and the reinforcing material. This operation may be accomplished in the prior art method in a continuous manner. Nevertheless, the impregnation achievable according to the prior art is not optimal as far as 100% adhesion is concerned. Defects in the impregnation are especially apparent when rovings prepared according to known methods are used in the so-called thimble or deadeye zone of the main rotor blades of a helicopter. It has been found that the rovings suffer in the blade root zone, which is subject to high loads, a premature shearing failure already at relatively low load cycles. The failure occurs substantially spontaneously within a few thousand load cycles following the first failure indications. The separating break has the appearance of a failure due to tension loads of the glass fibers. However, the failure is actually due to shearing fractures or cracks and is believed to be due to inadequate adhesion between the total available surface of the reinforcing material and the matrix formed by the impregnating resinous material.

OBJECTS OF THE INVENTION

In view of the above it is the aim of the invention to achieve the following objects singly or in combination:

to provide a method and apparatus for impregnating reinforcing materials such as fiber reinforcing materials in such a manner that the produced fiber compound materials will have a superior dynamic strength characteristic;

to make sure that the resinous binder material completely penetrates through the interstices between the reinforcing material while simultaneously avoiding or eliminating gaseous inclusions even of the tiniest dimensions in the body of the fiber compound material to thereby assure a homogeneously impregnated fiber compound material;

to repeatedly subject the impregnated material prior to the curing of the resinous binder material to pressure on opposite sides or surfaces of the material to thereby enhance the penetration of the binder material through the reinforcing material and to thereby drive out or adsorb and/or absorb gaseous inclusions;

to perform the homogeneous impregnation and gas removal or adsorption and/or absorption under controlled temperature and residence time conditions;

to assure a complete utilization of the available fiber surface of the reinforcing fibers for the adhesion of the resinous impregnating material to fibers, to precisely adjust the ratio of the weight of the resinous impregnating material to the weight of the reinforcing fiber material forming a band; and to provide a reinforced fiber compound material of a glass type transparency as opposed to the whitish translucency of prior art so-called prepregs, whereby such transparent fiber compound material has much improved material strength as compared to prior art prepregs.

SUMMARY OF THE INVENTION

The invention achieves the above objectives primarily in that the reinforcing material is transported substantially horizontally, after the application of the resinous binder material only to one surface of the reinforcing material, through an absorbing and adsorbing zone for a predetermined length of time while maintaining said absorbing and adsorbing zone at such a temperature that, in combination with the predetermined length of time a substantially complete absorption of the resinous binder material by the fiber reinforcing material is assured and so that any gaseous inclusions in the resinous binder material are either driven out or adsorbed by the resinous binder material, whereby the reinforcing fiber material is substantially completely saturated by the liquid resinous binder material when the material leaves said zone. Thereafter the exact weight ratio of resinous binder material to reinforcing fiber material is adjusted in a fulling station through which the material is advanced in a substantially vertical orientation which greatly facilitates said ratio adjustment because any excess resinous material may flow off easily due to the vertical orientation.

It has been found that by continuing the impregnation after the application of the resinous binder material to one side only, in an absorbing and adsorbing zone under controlled conditions the resinous binder material penetrates from the application side through the reinforcing material, whereby air inclusions are either pressed outwardly or are adsorbed so that air inclusions are removed from the fiber compound material. In this manner it is possible to achieve a homogeneously impregnated reinforcing material which does not have any weak spots due to air or gaseous inclusions. This removal of air and gas inclusions takes place according to the invention in the resinous material absorbing and adsorbing zone downstream of the application station as viewed in the feed advance direction of the reinforcing material. The substantially completely saturated reinforcing material is then withdrawn from the absorbing and adsorbing zone and is transported through a so-called fulling station in a substantially vertical orientation for removing any excess resinous material. If desired, further work stations may be arranged downstream of the fulling station. For example, one or more calibration nozzle stations and other treatment or utilization stations may follow the fulling station.

The invention assures a perfect bond between the entire available surface of the reinforcing fibers and the impregnating liquid binder material. This perfect bond is necessary for achieving the improved strength characteristics of the materials produced as taught herein. Due to such perfect bond it becomes possible to transmit loads or rather the resulting stress from the resinous binder material into the reinforcing fibers to thereby fully utilize the strength characteristics of these fibers. Thus, such bonding is critical for the overall strength characteristics of the finished material.

It has been found that a plurality of factors influence the bonding between the fibers and the resinous binder material. Such factors include the humidity, the interface surface tension between the fibers and the resin, the adsorption of any gas inclusion into the resin body or matrix, and especially the adsorption of moist air pockets at the bonding interface between fibers and the viscous resin. The exact ratio of the weight of the resin binder to the weight per unit of length of the fibers also influences the bonding strength. The present invention makes it possible to optimally satisfy all of these factors, but the adsorption of any gas bubbles or pocket at the surface of the fibers in the resin and hence elimination of non-binding zones between the fibers and the resin greatly increases the strength of the fiber compound material. Such strength is further enhanced by the exact weight ratio adjustment between resin and fibers.

The elimination of gas inclusions from interstices between fibers is accomplished by the particular treatment in the application of the resin to the fibers. The exact weight ratio adjustment is possible by the movement of the impregnated fibers through the fulling station in a vertical orientation.

A fiber compound material produced according to the invention, for example, an impregnated roving, has a green, glass-type transparency. Contrary thereto a roving impregnated according to the prior art method includes entrapped air and hence has a whitish translucent appearance. When the material produced according to the invention is used to manufacture main rotor blades for a helicopter in a laminating mold, it has been found that the resulting rotor blades have a substantially higher dynamic load characteristic than rotor blades made of the same type of reinforcing rovings impregnated according to the prior art. For example, tests have shown that rotor blades made of the material according to the invention do not show any load decrease even after more than $5 \times 10^6$ load cycles. Rotor blades tested under the same conditions but made of material impregnated according to the prior art exhibit load failures after a maximum of $0.02 \times 10^6$ load cycles. This is considered to be a non-predictable improvement.

Incidentally, the temperature in the resin absorbing zone is suitably maintained by circulating heated air through the absorbing zone.

According to the invention an optimal impregnation of so-called endless rovings is achieved in connection with warm or hot curing resin hardener systems, especially of the epoxy resin type, by maintaining in the resin absorbing zone a temperature in the range of 30° to 150° C. and assuring a residence or travel through time in this zone within the range of 30 to 120 seconds. For maintaining such a residence time or travelling through time the withdrawing or travel speed should be within the range of 0.2 to 0.5 m/s. The filament diameter of the reinforcing glass fiber material is suitably within the range of 5 to 15 microns, whereby the nontwisted glass silk rovings have a meter weight within the range of 600 to 2400 tex, whereby 1 tex is equal to 1 gram per 1000 m length of roving.

The method according to the invention is advantageously performed in an apparatus in which the reinforcing material is guided over an impregnating roller or cylinder which dips into a bath of the resinous binder material. The impregnating roller contacts but one side of the reinforcing material. Downstream of the impregnating station there is arranged a resin absorption zone through which the reinforcing material is moved in a substantially horizontal orientation. Such zone is constructed as a tower-type chamber in which guide rollers are arranged in alternating succession at the top and bottom of the chamber, whereby these guide rollers alternately reverse the travel direction of the material. The chamber is provided with heating and air blowing means which as such are of conventional construction. Downstream of the absorbing chamber there is arranged a guide arm which brings the material into a substantially vertical orientation for movement through a fulling station through which the material may be drawn with an adjustable speed. The vertical orientation of the material as it moves through the fulling station greatly facilitates the above mentioned weight ratio adjustment because the resin may flow off on both sides of the material. The air circulating means may comprise a blower which drives the air over heating coils for maintaining the desired temperature in the chamber.

Due to the bending of the impregnated material repeatedly in alternate directions by the guide rollers in the absorbing chamber the intimate and complete penetration of the reinforcing material by the binder material and the removal of air is enhanced.

BRIEF FIGURE DESCRIPTION

In order that the invention may be clearly understood, it will now be described by way of example, with reference to the accompanying drawings, wherein:

FIG. 1 is a side view of an apparatus according to the invention for performing the present production method;

FIG. 2 is a top plan view onto the apparatus of FIG. 1 substantially in a plane defined by section line II—II in FIG. 1; and FIGS. 3 and 4 show on an enlarged scale relative to FIG. 1 the operation of the rollers in the treatment chamber.

DETAILED DESCRIPTION OF PREFERRED EXAMPLE EMBODIMENTS AND OF THE BEST MODE OF THE INVENTION

Referring to FIGS. 1 and 2, the reinforcing fiber materials 1, for example, comprising a plurality of glass rovings in the form of fiber bands 1 are guided in parallel to one another, but without contact. The material is pulled off from a supply roller in a substantially horizontal orientation, for example, by means of a pull-off device such as a warp beam. A feed advance mechanism including a guide or lead-in roller 4 feeds the roving so as to travel substantially horizontally into contact with an impregnating roller 3 followed by a lead-out roller 5 which feeds the rovings 1 into the absorbing and adsorbing treatment chamber 6 past a lead-in roller 12 provided with longitudinal grooves 12' extending in parallel to the longitudinal axis of the roller 12. These grooves 12' are preferably uniformly distributed about the circumference of the lead-in roller 12 and also on the surface of the other guide rollers 11, 11' in the chamber 6 for facilitating a smooth run of the reinforcing material by preventing the coiling of individual fibers or threads which have been separated from the rovings of the reinforcing material.

The impregnating roller 3 is rotatably supported in a trough 2 holding the resinous binder material. If desired, the roller 4 may be positively driven by conventional means such as an electric motor or the like. In any event, the roller 3 coats only one surface of the fiber bands 1. As the roller 3 rotates, it transports by adhesion a desired quantity of resinous binder material for application to the underside or surface A of the reinforcing material 1 running over the roller 3, whereby the material 1 entrains the resinous material and takes it along into the tower-type treatment chamber 6. The bands 1 are referred to by reference 1' downstream of the roller 3 as viewed in the feed advance direction from right to left.

Although the inlet roller 12 is shown to be arranged at the bottom of the chamber 6, it may also be arranged at the top or intermediate the ends of the chamber 6. However, the inlet roller 12 will be positioned to contact the fiber bands 1' on the side or surface B which is opposite to the coated side A as shown in FIG. 1. Similar considerations apply for the outlet guide roller. Between the inlet and outlet rollers, the guide rollers 11 and 11' are arranged in alternate succession on opposite sides A, B of the bands 1' so that the direction of movement of the reinforcing material bands 1' is repeatedly reversed prior to its exit from the chamber 6, whereby the complete penetration of the reinforcing material by the binder material and the removal of air from the fiber compound material is enhanced as will be described in more detail below with reference to FIGS. 3 and 4. The feed advance direction is indicated by the arrow 10. The number of guide rollers 11, 11' which may be arranged in the manner of a calender, is selected in such a way, depending on the feed advance speed of the material 1, that the desired residence or travel through time in the chamber 6 is achieved.

A guide wall 8 is arranged in the chamber 6 for guiding an airstream indicated by the arrows 9 inside the chamber 6. The airstream is produced by a heater blower device 7 of conventional construction to keep the air circulating inside the chamber 6. The air is heated to such an extent that inside the chamber a desired temperature is maintained at a substantially constant level. The temperature is selected so as to assure the desired viscosity of the resinous binder material applied to the material 1' so that the binder material may penetrate through or "sweat" through the reinforcing material from the side A to which it has been applied to the opposite side B. This penetration or sweating through is even enhanced by the operation of the reversing rollers 11, 11' and 12 because these rollers are so positioned that alternate rollers contact opposite surfaces of the reinforcing material bands 1.

In addition to the above mentioned function of the grooves 12' in the rollers 12 and 11, 11' of preventing a coiling of individual filaments of the reinforcing material 1', these grooves also provide receptacles for excess binder material, thereby assuring a smooth run of the reinforcing material 1' over the rollers 11, 11' and 12.

A receptacle 13 receives excess resinous binder material dripping down from the roller ends out of the grooves 12' and also dripping off the reinforcing material 1'. Downstream of the tower-type chamber 6 there is arranged a guide arm 16 which guides all the bands or rovings 1' out of a substantially horizontal orientation into a substantially vertical orientation for travel through a fulling station 14 in which any remaining excess resinous material is stripped off the reinforcing and now impregnated material 1. Downstream of the fulling station 14 there is preferably arranged a further guide arm 18 and a calibration device 15 and other working or utilization stations not shown.

The fulling station 14 comprises a trough 14' in which any excess resin material is collected. Upper and lower vertically extending fulling pins 17 are adjustable relative to each other as indicated by the double arrows 23 in FIG. 2. The adjustment means for the fulling pins 17 are not shown since they are conventional. By adjusting the position of the fulling pins 17 in combination with the substantially vertical orientation of the bands 1' in the fulling station the invention provides a means for very precisely controlling the weight ratio of resin material to fiber material per unit of length. Adjustments as precise as ±0.03% of a given weight ratio have been made. This precision is very important for achieving the desired material strength of the finished product made of the resulting fiber compound material.

The further guide arm 18 downstream of the fulling station 14 preferably brings the impregnated fibers back into a substantially horizontal orientation for horizontal feeding into the calibration device 15 which combines, for example 18, bands, strands, or rovings, into a single sheet of fiber compound material having the required width horizontally and the required thickness vertically when leaving the calibration device 15.

The reinforcing material may preferably be selected in the form of rovings made of glass fibers, carbon fibers, or fibers of aromatic polyamides.

The following examples further illustrate the invention.

EXAMPLE 1

Eighteen rovings made of nontwisted glass silk monofilaments having a diameter of 9 microns are assembled to form a so-called warp beam charge. These glass silk monofilaments are known under the type designation EC 9-756-K 43/68 HF, Code 6805.

These filaments forming the reinforcing fibers have a temperature of 50° to 60° C. and are held in an atmosphere having a relative humidity of 40 to 70%. The rovings pulled off the warp beam run individually over an impregnating cylinder 3 dipping into a bath of resinous binder material contained in a trough 2. The resin is in this example a condensation product of epichlorohydrin and 4,4-Diphenylolpropane which is free of any additives such as solvents, thinners, and so forth. The chemical basis for the hardener is 4,4-Diaminodiphenylmethane. The mixing ratio of resin to hardener is 100:27 parts by weight. The bath temperature is in the range from 49° to 50° C. The viscosity of the resin hardener system in the bath is within the range of 200 to 500 mPas.

The impregnating roller 3 carries out of the bath a resinhardener film having a defined thickness. This film impregnates the glass rovings on the contact side A where the rovings 1 contact the impregnating roller or cylinder 3. The excess resin of the impregnated rovings 1' downstream of the roller or cylinder 3 is within the range of 20 to 40% by weight. The rovings 1' coated on one side only are introduced into the chamber 6 with a feed advance speed of 13 m/s. In the chamber 6, as shown in the drawing, seven guide rollers 11, 11' are arranged as mentioned above. The degree of saturation of the resin hardener system at the entrance of the chamber 6 is still within the range of 120 to 140%. In the chamber 6 the individual rovings forming the coated reinforcing material 1' are guided one next to the other so that the resin may penetrate or sweat through the respective rovings from the coated side A to the opposite side B. Due to the increased temperature in the chamber 6 which is maintained within the range of 50° to 60° C. and due to the constant feed advance speed the material exchange is optimally facilitated. The heated air which is circulated to maintain a constant temperature throughout the volume of the chamber 6 is a dry air in order to keep gases in solution in the resin binder.

The vertical spacing between a lower guide roller 11 and an upper guide roller 11' is about 1.5 m to 2 m. The diameter of the guide rollers 11 is about 120 mm. The grooves 12' extending in parallel to the longitudinal roller axis in the entrance roller 12 and in the guide roller 11, 11' have a depth and a width of 4 mm each. The entire length of the rovings within the chamber 6 is about 10 m so that the residence or travel through time is within the range of 45 to 50 seconds. The impregnation is completed when the rovings 1' exit from the chamber 6. About 0.5 m downstream of the chamber 6 there is located the above mentioned fulling station 14 for adjusting the exact resin proportion after guiding the rovings out of a substantially horizontal orientation into a substantially vertical orientation by means of the guide arm 16, such that the width dimension of the bands is oriented substantially vertically. If it is desired, for example, to obtain a glass to resin weight proportion of 73.4% by weight of the total weight, then it is necessary to provide a resin volume proportion of 42%. Any excess resin material removed in the fulling station 14, for example, by means of the vertical fulling pins 17 in the form of blades or rollers, is collected in a chamber 14' and returned into the trough 2.

About 0.5 m downstream of the fulling station 14 there is arranged a calibration nozzle 15 for achieving the desired belt cross-section of $0.8 \times 20$ mm. The calibration nozzle or device 15 is not shown in detail since it is not part of the invention. The further guide arm 18 between the fulling station 14 and the calibration device 15 may be used for feeding the impregnated rovings 1' horizontally into the device 15. The calibrated roving belts are pulled off in lengths of 10 m and severed. At this time a piece of roving having a length of 20 cm is cut off and placed on a precision scale for weighing. Depending on the weighing result the fulling pins or rollers are manually adjusted so as to in turn adjust the ratio beween resin and roving material as precisely as down to ±0.03 per thousand (‰) of a given weight ratio.

A roving produced in the manner described above has a glass type transparency and is placed into one half of a laminating mold for manufacturing a rotor blade. The roving is massaged, for example, with a spatula so that it assumes the contours of the mold. The roving retains its greenish transparency. It has been found that rotor blades manufactured as described may be exposed dynamically to load cycles up to $5 \times 10^6$ without the occurence of any defects. On the other hand, rotor blades made of rovings impregnated according to the prior art show defects with certainty if load cycles of $0.02 \times 10^6$ are reached. It has further been found that differences in the pulling speed or in the travel through speed of the reinforcing material 1 through the chamber 6 do not have a disadvantageous influence on the optimal impregnation. On the other hand, according to prior art impregnating methods it is necessary to maintain precisely the pulling off speed.

EXAMPLE 2

For producing a roving belt of an aromatic polyamide fiber with a polyurethane resin matrix to manufacture a tension element, coils of aromatic polyamide fibers such as are known under the trade name Kevlar 49 manufactured by DuPont are assembled to form a warp beam charge. The yarn of the just mentioned type has a Denier value of 1420 and is not provided with any means for enhancing the adhesiveness. The polyamide fiber or yarn coils are maintained, prior to their use, for ten hours in an environment having a relative humidity of 10 to 30% and having a temperature in the range of 110° to 130° C. These yarns are not twisted and are pulled off the warp beam whereupon they run, as in Example 1, over the impregnating roller or cylinder 3. The resinous bath comprises a polyurethane resin hardener system having a viscosity in the range of 100 to 150 mPas at a temperature between 25° and 30° C. This type of resin is a diisocyanate. In order to avoid exothermic reactions the total quantity of resin does not exceed 1 kilogram.

The polyamide fiber yarn travels through the chamber 6, the internal temperature of which is kept within the range of 30±2° C. The other features or steps correspond to those of Example 1. The resulting roving belt has a homogeneous, optimal resin impregnation which is substantially free of any air inclusions due to mechanical squeezing out of air bubbles and due to adsorption of any remaining gas inclusions in the resin.

A tension element made of roving belts impregnated as just described, may be subjected to very high tension loads.

EXAMPLE 3

Ten coils of a high strength carbon fiber of the type T 300 6K made by Toray in Japan are assembled to form a warp beam charge. The cross-section of a fiber bundle is 0.2 mm². The carbon fiber coils on the warp beam are maintained for five hours at a temperature of 90° C. to 100° C. and at a relative humidity within the range of 30 to 50%. The carbon fiber yarns which are not twisted are then pulled off the warp beam and guided over the impregnating roller or cylinder 3. The trough 2 holds a polyamide resin of the type H 353 made by Technochemie of Duessenheim, West Germany. The resinous binder material in the trough 2 is maintained at a temperature within the range of 125° to 130° C. In order to keep the thermosetting single component resin in liquid form, or rather in solution, it is necessary that all guiding elements and rollers are preheated. The resin is very viscous. The kinematic viscosity is within the range of 1 to 1.5 cm²/s. Such viscosity is maintained during the time of working the material. The carbon fibers are guided through the chamber 6 in the same manner as the roving fibers described in Example 1, whereby the temperature in the chamber 6 is maintained by air circulation having a temperature within the range of 140° to 160° C. The rollers 11 and 12 are maintained at a temperature in the range of 125° to 130° C. A complete penetration of the carbon fiber yarns by the resin is accomplished to the exclusion and adsorption of substantially all entrapped air bubbles. In order to compensate for any heat losses infrared radiating heaters may be arranged upstream and downstream of the chamber 6 as viewed in the feed advance direction of the carbon fibers. The roving belts produced according to Example 3 are especially suitable for manufacturing so-called "advanced rotor blades" and for making turbine blades or vanes.

EXAMPLE 4

This example relates to the impregnating of a belt of glass webbing for the manufacture of the covering skins of longitudinal structural components having a defined torsion stiffness. For this purpose a glass silk webbing coil is used having a width corresponding to the width of the structural component. In order to increase the torsion stiffness a special kind of webbing is used in which the glass fibers are oriented at ±45° relative to the pull off or travel direction of the webbing. In this type of webbing the glass fibers oriented in different directions may either by tied to one another to a certain extent or they may be merely connected by binding threads without any tying, whereby one thread rests on another. The area or surface weight of such a glass silk webbing may be within the range of 50 to 500 g/m².

The coil or spool of glass webbing is preheated to 60° C. in an environment having a relative humidity within the range of 50 to 70%. All other treatment parameters are the same as set forth above in Example 1.

The belt of glass webbings is transported through the entire impregnating and absorbing chamber 6 in the same manner as the rovings. However, it is to be noted that by using a webbing with fibers or threads running in directions at ±45°, it is necessary that threads must also be arranged in the pulling off direction to avoid the so-called "cravat effect". All types of webbings may be pulled through the chamber 6 in the warp direction or in the weft direction for the impregnation.

After the webbing belt has left the chamber 6 the impregnation is completed. Downstram of the chamber 6 the layer of the impregnated webbing belt is tilted through about 90° by means of the guide arms 16 and, if desired also 18 downstream of the fulling station 14. Approximately 1 m downstream of the chamber 6 a fulling station is arranged for adjusting the desired resin content in an exact manner. In this connection it is also important that the removal of any excess resin hardener proportion is carried out only after completion of the impregnating.

According to the invention it is possible to impregnate webbings having the following advantages. The impegnated webbing according to the invention has a glass type transparent appearance. Contrary thereto, a webbing prepreg according to the prior art has a whitish translucency which appears to be due to an insufficient or faulty impregnation resulting in air inclusions and inadequate bonding. The disadvantages of such faulty impregnation are mainly due to the mechanical characteristics of the resulting products. According to the invention it is easily achieved to satisfy a rated glass weight proportion of about 50% and to precisely maintain that proportion at a constant level. Another advantage is seen in that for the construction of blade skins the labor costs are substantially reduced as compared to prior art manual impregnating methods.

FIGS. 3 and 4 illustrate on an enlarged scale compared to FIG. 1, the function of the rollers 11 and 11'. An upper roller 11' is shown in FIG. 3 and rotates counterclockwise as indicated by the arrow 21, in contact with the surface A of a band or roving 1'. The surface A has just been coated with resin while running over the roller 3. Due to the pull of the roller 11' in contact with the resin coated surface A of the band 1' the resin is pressed in the direction 19 through any interstices between adjacent fibers toward the surface B of a band 1. In FIG. 4 the surface B comes into contact with the next, clockwise rotating lower roller 11. Arrow 22 indicates the rotation direction. Now the resin is pressed through any interstices or spaces as indicated by the arrows 20 from surface B to surface A. Thus, the resin is caused to repeatedly and sequentially travel from surface A to surface B and vice versa as it passes through the treatment chamber 6. This travel has been compared to a "sweating through", whereby gas inclusions in the interstices or spaces between fibers are substantially completely eliminated either by being pressed out of the interstices or spaces or adsorbed into the resin material. Such elimination of gas inclusions has greatly increased the material strength of fiber compound materials produced as taught herein.

Although the invention has been described with reference to specific example embodiments, it will be appreciated, that it is intended to cover all modifications and equivalents within the scope of the appended claims.

What is clamed is:

1. An apparatus for producing fiber compound material made of bands of reinforcing fiber material impregnated with a liquid resinous binder, comprising a container (2) for holding said liquid resinous binder, impregnating roller means (3) defining with its upper surface a given level, said impregnating roller means being arranged for rotatably dipping into said container (2) for carrying liquid resinous binder material on the surface of the roller means out of the container, first guide means (4, 5) located upstream and downstream of said impregnating roller means (3) and at a level below said given level for pressing said bands against said upper surface of said impregnating roller means and for guiding a plurality of said bands of reinforcing fiber material in parallel to one another and into contact with said impregnating roller means so that only one surface of each band contacts said upper surface of the impregnating roller for applying an excess quantity of said liquid resinous binder only to said one surface of the bands, chamber means (6), temperature and air flow control means (7) in said chamber means for circulating heated air through said chamber means (6), calender type roller means (11, 11', 12) arranged in said chamber means for advancing said bands with the liquid resinous binder through said chamber means for completely soaking said bands with said liquid resinous binder, further guide means (16) arranged downstream of said chamber means (6) as viewed in the feed advance direction of said soaked bands for guiding said soaked bands out of a substantially horizontal feed advance into a substantially vertical feed advance such that width dimension of the bands is oriented substantially vertically, a fulling station (14) arranged downstream of said further guide means (16) for precisely adjusting the ratio of the quantity of liquid resinous binder material in the bands relative to the quantity of reinforcing fiber material to form fully impregnated bands, and calibrating means (15) arranged downstream of said fulling station for combining a plurality of impregnated bands for achieving a desired cross-section of the fiber compound material.

2. The apparatus of claim 1, wherein at least one of said calender type roller means comprises longitudinal grooves extending in the surface of the roller means substantially in parallel to the longitudinal roller axis.

3. The apparatus of claim 1, wherein said calender type roller means (11, 11', 12) are arranged in said chamber means (6) in such positions that a first inlet roller (12) contacts said bands on the surface opposite said one surface coated with said liquid resinous binder for first bending said bands so that the coated surface is first on the outside curve of the respective bend, and so that further guide rollers (11, 11') contact the bands alternately on the respective opposite surface whereby the bands are bent in alternately opposite directions for facilitating the complete penetration of the reinforcing fiber material by the liquid resinous binder.

4. The apparatus of claim 1, comprising further guide means (18) operatively positioned between said fulling station (14) and said calibrating means (15) for guiding the fully impregnated bands out of a substantially vertical feed advance into a substantially horizontal feed advance into said calibrating means (15).

5. The apparatus of claim 1, wherein said fulling station (14) comprises a plurality of vertically extending position adjustable rods (17) for said precise adjusting of the ratio of liquid resinous binder material to the reinforcing binder material.

6. The apparatus of claim 1, wherein said calender type roller means (11, 11', 12) are arranged in said chamber means (6) in such positions that a first inlet roller (12) contacts said bands on the surface opposite said one surface coated with said liquid resinous binder for first bending said bands so that the coated surface is first on the outside curve of the respective bend, and so that further guide rollers (11, 11') contact the bands alternately on the respective opposite surface whereby the bands are bent in alternately opposite directions for facilitating the complete penetration of the reinforcing fiber material by the liquid resinous binder.

* * * * *